Nov. 17, 1942.   F. W. MANNING   2,302,623
CONTINUOUS DEPTH FILTER HAVING AN EXTERIOR CYLINDRICAL RETAINING WALL
Filed March 31, 1939   3 Sheets-Sheet 1

INVENTOR.
Fred W Manning

Nov. 17, 1942.   F. W. MANNING   2,302,623
CONTINUOUS DEPTH FILTER HAVING AN EXTERIOR CYLINDRICAL RETAINING WALL
Filed March 31, 1939   3 Sheets-Sheet 2
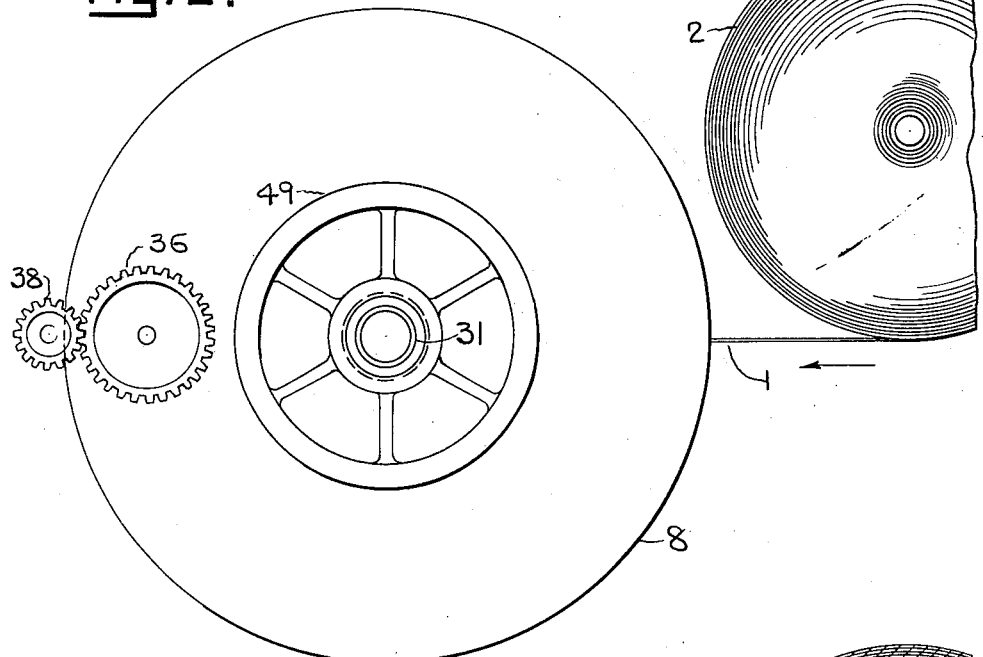
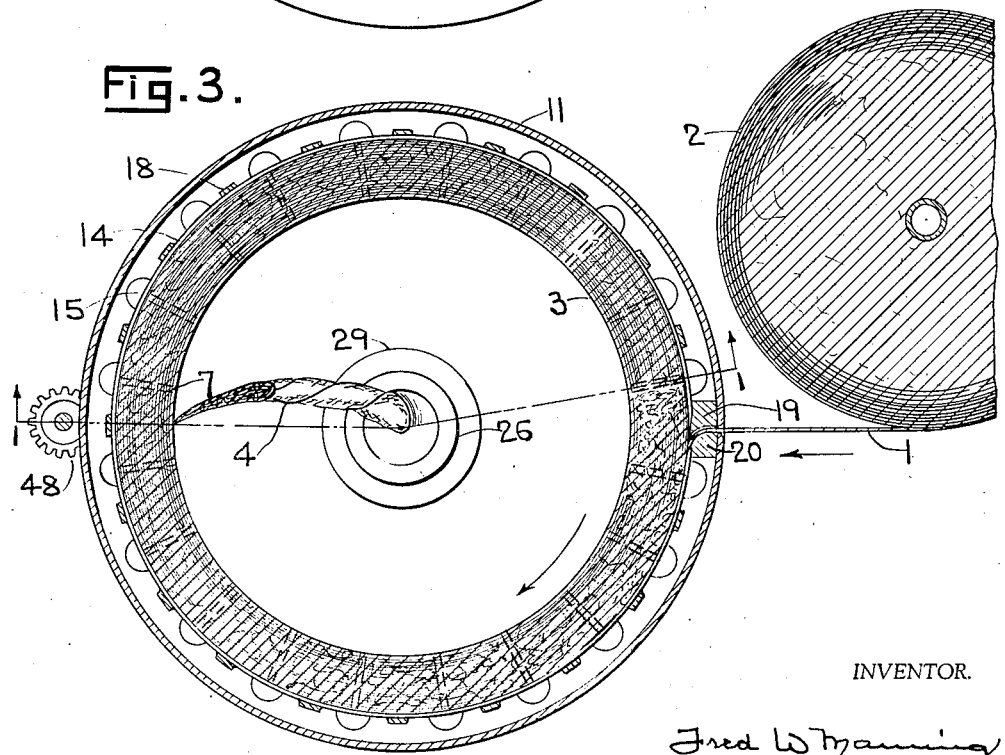
INVENTOR.
Fred W Manning Nov. 17, 1942.  F. W. MANNING  2,302,623
CONTINUOUS DEPTH FILTER HAVING AN EXTERIOR CYLINDRICAL RETAINING WALL
Filed March 31, 1939  3 Sheets-Sheet 3

INVENTOR.
Fred W. Manning

Patented Nov. 17, 1942

2,302,623

UNITED STATES PATENT OFFICE 2,302,623

CONTINUOUS DEPTH FILTER HAVING AN EXTERIOR CYLINDRICAL RETAINING WALL

Fred W. Manning, Palo Alto, Calif.

Application March 31, 1939, Serial No. 265,248

9 Claims. (Cl. 210—196)

This invention relates to filters in which filter beds of contiguous layers of treating material are moved in one direction while the fluids being treated filter therethrough in a counter direction, and is particularly adapted to the clarification of fluids for which filter aids have been used heretofore for precoating purposes. This application is a continuation-in-part of my co-pending applications: Serial No. 750,460, filed October 29, 1934; and Serial No. 101,460, filed September 18, 1936; both subsequently issued as patents, 2,152,900, and 2,152,902, respectively.

It has been the practice heretofore to accomplish the clarification of liquid fluids by means of the passage of the fluid through one thickness of woven or felted fabric, which was usually given a precoating of some non-compressible solids, such as kieselguhr, to increase the rate of filtrate flow and to prevent the impurities from entering the fabric. If the precoating were thin, the flow rate dropped off rapidly with the clogging of the precoating, and the cycle of precoating, filtering, and cleaning the filter wall, soon had to be repeated; if the precoating were of considerable depth, it was gradually removed at a uniform rate of speed, layer by layer as each became clogged, thereby prolonging and increasing the flow rate, but also reducing the clarity, as the precoating diminished in depth. To avoid the disadvantages incident to the cycle of building up, and washing, and removing, precoatings of non-compressible solids, surface type filters were developed, as described by U. S. Patents Nos. 2,055,872; 2,055,873; 2,055,874; and 2,055,927, dated September 29, 1936; in which rolls of preformed layers of fibres were used instead of the usual precoating solids. Altho such rolls can be introduced into a filter in a dry state for immediate use, and operated under suction or pressure in a completely submerged condition, and the soakage completely expressed therefrom during extrusion of the contaminated fabric from the filter, and all operations accomplished continuously; yet the main objection to all "precoating" and "surface type" filters remains; i. e., the flow rate of the filtrate is always greatly restricted due to the necessity of consolidating the solids sufficiently for all impurities to be removed by passage of the fluid through any one layer. This means, of course, that if the last layer of a precoat gives a finished filtrate, the total layers of the entire precoat will give a superfinished filtrate, which in the case of many fluids would result in the complete removal therefrom of all essential values, such as taste, color, and aroma, from fruit and vegetable juices, etc.

The clarification of elastic fluids, such as the scrubbing of air in air-conditioning units of private residences, has been accomplished by passing air through comparatively shallow mats of fibrous material, which were often coated with a viscous liquid for the purpose of collecting the dirt particles by adhesive impingement. Small installations were usually given but little attention, and the mats were sometimes neglected until they had become clogged with an excessive amount of filth with the result that frequently the increased resistance to the air passing through a filter prevented all air circulation, and threw the entire air conditioning plant out of commission. Moreover, as dust particles are most active carriers of bacteria, the filter mats often changed from being an instrument of purification into a source of contamination for the air passing therethrough; and the furnace heating of dust particles not only made the latter more active, but the dry distillation of organic matter resulted in the formation of ammoniacal and other obnoxious gases, all of which accentuated the conditions conducive to making the filter mats a source of contamination.

It is well known to those versed in the art of filtration that the clarity and flow rate of the filtrate and the porosity and depth of the filter bed have definite relative values, and that the clarity can be maintained with a greatly increased flow rate providing the depth of the filter bed is sufficiently increased to compensate for the increased porosity of the solids that make up the bed. It is also known that the treatment of solids and fluids can be made much more effective by their contact in movement in counter directions.

The objects of the present invention are therefore to provide means whereby: the flow rate of a liquid filtrate is greatly increased by substituting "depth" filtration through a very porous filter bed of contiguous layers of fibrous material supported by an exterior retaining wall, for "surface" filtration through a dense layer, or layers, of non-compressible solids in which each layer is supposed to be able to remove all objectionable solids from the liquid being filtered; the scrubbing of air, or other elastic fluid, is likewise accomplished at higher velocity through a filter bed of greater depth and smaller area than formerly; the flow rate and clarity of the filtered fluid is continuously maintained throughout the entire filtering operation; and the efficiency of the treating solids augmented by moving the layers in a direction counter to the flow of the fluid.

In accordance with one aspect of my invention, a plurality of contiguous layers of fibres are used to form a filter bed of comparatively great depth and porosity throughout which the impurities of the fluid being filtered are adsorbed or otherwise retained. As the bed becomes contaminated to a predetermined extent, a layer of fibres is removed from the fluid inlet surface of the bed, and in suitably timed relation with each such removal, a fresh layer is removed from a reserve roll and interposed between the fluid outlet surface of the bed and its retaining wall as the two are moved relatively to each other, the removal of the contaminated layers and the application of fresh layers causing the filter bed to move in a direction counter to the flow of the fluid. The amount of fresh fibres fed into filtering position should be substantially equivalent to the amount of contaminated fibres removed, the supply and removal of the fibres being regulated by one revolution of the filter bed, or continued for a predetermined interval controlled by a timing mechanism, and in either case, being repeated with sufficient frequency to maintain the filtering pressure, or the filtrate head, or the filtrate flow rate, substantially constant. The fibres may be applied to the filter bed in a discrete condition and removed therefrom in a similar state, but preferably, are bonded together by such materials as adhesives, reinforcing fibres, threads etc., to form a fabric the manufacture of which is described in my U. S. Patents Nos. 1,782,784; 1,782,785; 1,786,669; 2,152,-901; and 2,218,338. The relative movement of the filter bed and retaining wall may be facilitated by withdrawing the bed away from the wall as described in my U. S. Patent No. 2,152,-900; or by retracting the wall away from the bed as described in my U. S. Patent No. 2,152,902; or the relative movement of the bed and wall may be accomplished without either withdrawal of the bed or retraction of the wall, as hereinafter described.

The invention is exemplified in the following description, and one form of apparatus for carrying out the process is illustrated by way of example in the accompanying drawings, in which:

Fig. 2 is a plan view of the filter shown in Fig. 1.

Fig. 3 is a cross-section of the filter taken on line 3—3 of Fig. 1.

Figure 1:
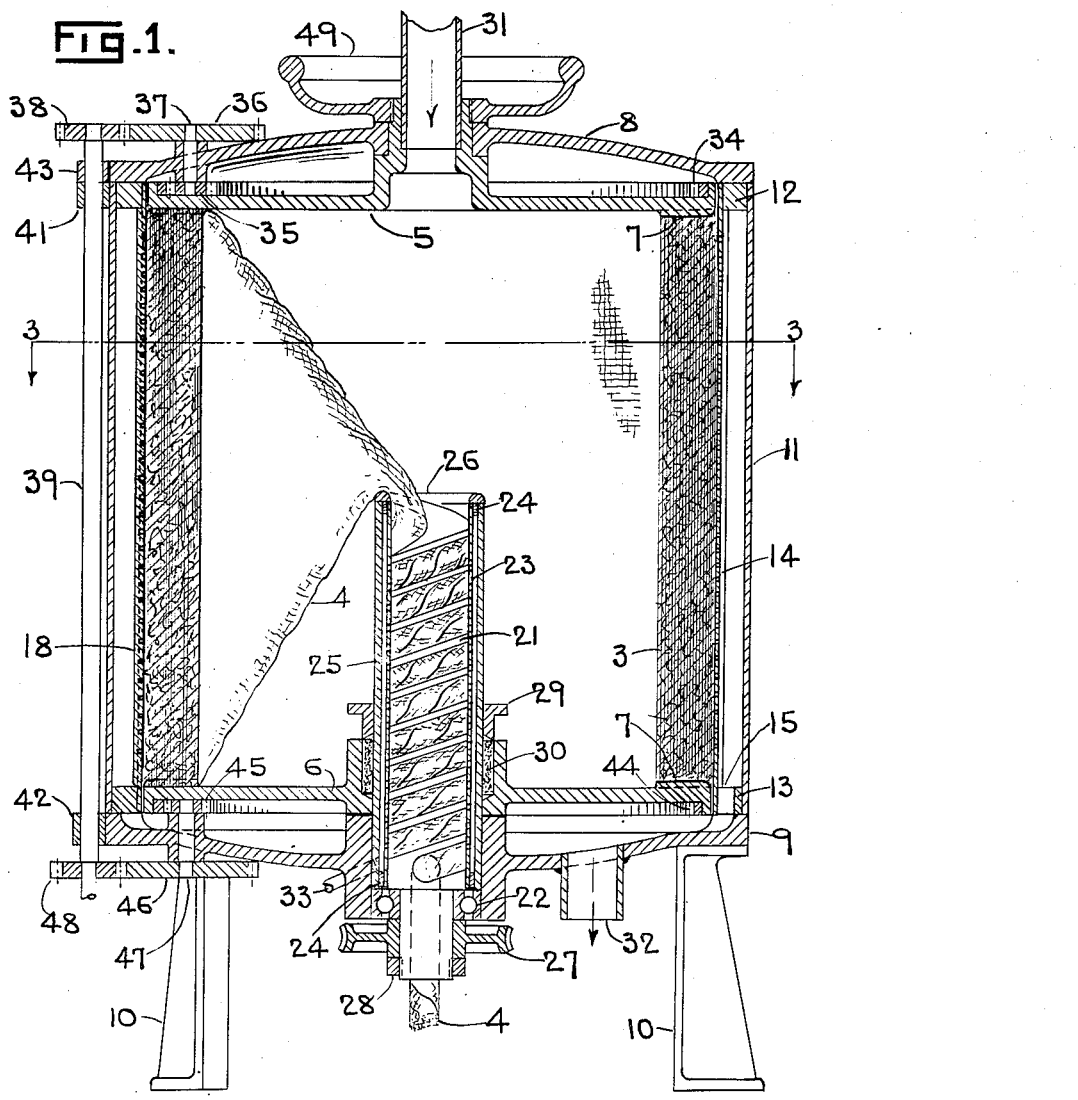
Fig. 1 is a vertical section of the filter taken on line 1—1 of Fig. 3.
Figure 4:
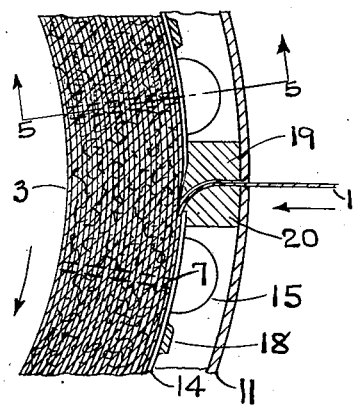
Fig. 4 is an enlarged fragmentary cross-section of the fabric slot arrangement through the filtrate housing, shown in Fig. 3.
Figure 5:
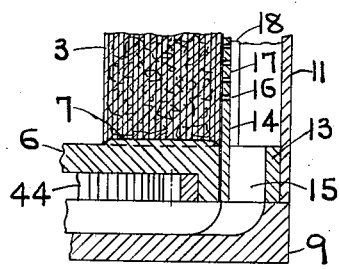
Fig. 5 is a fragmentary vertical section of the filter bed supports taken on line 5—5 of Fig. 4.

Referring more specifically to the drawings by reference characters: A layer of fibres in the form of fabric 1 is drawn from a fresh supply roll 2 through a slot in the filtrate housing into the fluid outlet surface of an annular filter bed 3, and is ultimately removed in a twisted condition from the fluid inlet surface of the bed as web 4, and extruded from the filter. The ends of the annular filter bed are closed by a top rotating flange 5 and a bottom rotating flange 6, each being equipped with radial fins 7 to engage and carry the filter bed; and the flanges are centralized and supported by top cover plate 8 and bottom cover plate 9, respectively, the latter being supported by legs 10. The filtrate housing consists of shell 11, top and bottom circumferential rings 12 and 13, respectively, and the foraminous retaining wall 14, the lower circumferential ring having filtrate outlet openings 15. As shown in Figs. 4 and 5, the grooves 16 are cut entirely through the retaining wall thereby dividing the latter into rings 17, which are held rigidly in position by ribs 18, the fabric slot bars 19 and 20 supporting the ends of the retaining wall and closing the slot entrance against passage of the filtered fluid. The extrusion screw 21 is supported by a ball bearing 22, which is rigidly fixed in the bottom cover plate; and surrounding the screw is the foraminous retaining wall 23 centrally located by rings 24 in the pipe 25, which is also supported in a fixed position by the lower cover plate. The upper end of the extrusion screw forms an annular ring 26 through which the contaminated fabric is pulled, and to the lower end of the screw is keyed the worm gear 27, which is locked in position by a nut 28. Gland 29 and packing 30 prevents leakage of untreated fluid past the lower rotating flange into the bottom cover plate. Fluid to be treated enters through the pipe 31, which is screwed into the top rotating flange, and after being filtered leaves by outlet 32; and the outlet 33 carries off the soakage expressed by the extrusion screw. The top rotating flange is driven by means of: an internal gear 34, gears 35 and 36 on the shaft 37, and gear 38 on the driving shaft 39, the latter being supported by top and bottom bearings 41 and 42, respectively, and collar 43, and driven from a source of power not shown; likewise, the bottom rotating flange is driven by means of: an internal gear 44, gears 45 and 46 on the shaft 47, and gear 48 on the driving shaft. Hand-wheel 49 may be used to turn the rotating flanges.

Figure 6:
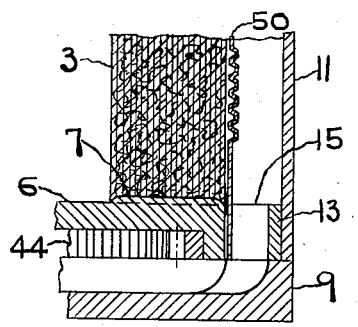
Fig. 6 is a fragmentary vertical section of a modified form of the filter bed supports shown in Fig. 5.

Fig. 6 shows a foraminous retaining wall 50 in which the circumferential grooves are crimped in the plate, the openings being at the bottom of the crimps so as not to obstruct the movement of the filter bed thereover.

Figure 7:
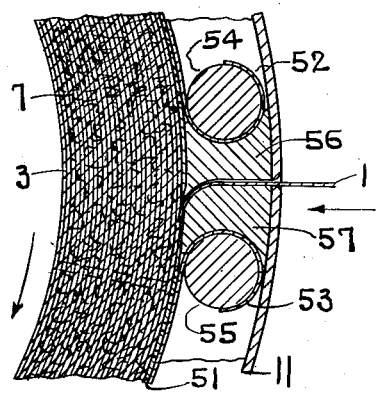
Fig. 7 is a fragmentary cross-section of a modified form of the fabric slot arrangement shown in Fig. 4.

Fig. 7 shows a retaining wall 51, which may be retracted away from the filter bed to interpose fresh fabric therebetween. The retraction is accomplished by steel bands 52 and 53 that are attached to the retaining wall and which pass around the shafts 54 and 55, respectively, one or both shafts being rotated from a source of power not shown. During retraction of the retaining wall the filter differential pressure may be reduced to zero either by closing the filtrate outlet or by shutting-off the supply of unfiltered fluid. In this figure the fabric slot entrance is between bars 56 and 57.

Figure 8:
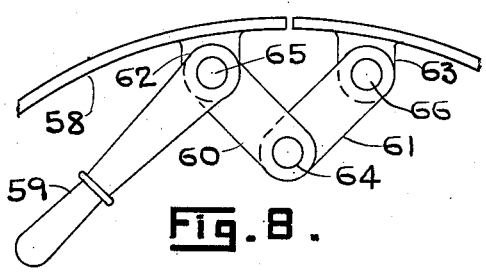
Fig. 8 is a fragmentary end view of the expansion cylinder on which the original filter bed is wound.

Fig. 8 shows a fabric winding shell 58, which may be expanded for winding purposes by means of: the operating lever 59, toggle links 60 and 61, which are fastened together and to the brackets 62 and 63 of the shell by means of pins 64, 65, and 66, respectively.

Figure 9:
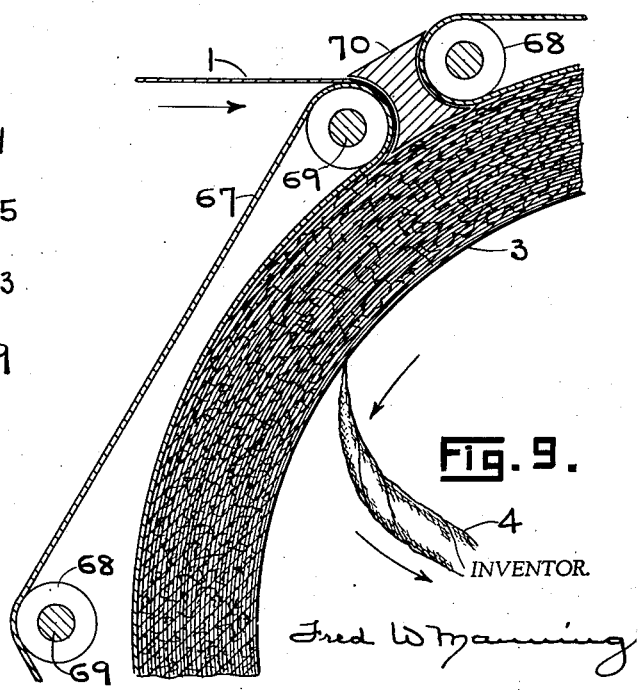
Fig. 9 is a fragmentary cross-section of an arrangement showing how fresh fabric may be carried into filtering position between a filter bed and a retaining wall moving together.

Fig. 9 shows an arrangement in which new fabric can be introduced through a retaining wall and carried onto the fluid outlet surface of the filter bed by means of an endless foraminous belt 67 travelling in contact with the bed and over the guide rollers 68. The rollers may rotate on pins 69, and the belt be carried by movement of the bed; or one of the pins may engage its roller and be driven from a source of power not shown, and thereby actuate the movements of the belt and filter bed. Closure piece 70 serves to close the space in the retaining wall entrance for the fresh fabric.

The operation of the apparatus thus constructed has been in part indicated in connection with the foregoing description, but before placing the filter in operation the filter bed must be formed. This may be accomplished by introducing the winding cylinder 58 in its extended condition, between the rotating end plates 5 and 6, centralizing it by radial fins 7, attaching to the cylinder fabric introduced through the filtrate housing from the reserve roll 2, and rotating the end plates until the spacing between the winding cylinder and the retaining wall has been filled. The winding cylinder may then be collapsed and withdrawn from the filter after which the inner end of the fabric can be drawn through the extrusion screw by the rotation of the latter. The solid content of the fluid entering at 31 is deposited on the surface, and distributed throughout the depth of the filter bed; and the filtered fluid, after flowing from the filtrate housing through openings 15 into the basin of the bottom cover plate 9, leaves by outlet 32. Clogging of the filter bed will cause the flow rate to slow up, or the filtering pressure to rise, or both; therefore by means of a timing mechanism responsive to the flow rate or pressure, the screw may be actuated to remove sufficient fabric to maintain these factors constant; and the rotation of the driving shaft 39 may be synchronized to the movements of the screw to keep the filter bed at a constant depth; or the removal of the utilized layers from the filter bed, and the application of fresh layers to the bed, may be accomplished by manual operations. The rotation of the screw will result in the solids deposited on and in the first layer of the filter bed by passage of the fluid through the bed, being enclosed within the fabric as it is wrapped round and round upon itself, the rolling of the fabric being sufficient to compact the solids into a firmly twisted cord before the latter enters the screw. Relative movements between the filter bed and retaining wall for the purpose of interposing fresh fabric may be accomplished because of the continuous drainage channels 16 between the rings 17 offering a minimum of resistance to such movements. However, where perforated plates, or other structure, is used in which continuous channels are not possible, a relative movement between the bed and wall may be accomplished, if the two are released from their close contact with each other by a reversal of the filter differential pressure, or a retraction of the retaining wall away from the bed as shown in Fig. 7; or the interposition of fresh fabric between the bed and wall may also be accomplished by movement of the two together, as shown in Fig. 9

It will be obvious from the foregoing description: that a counter-current movement of a fluid and treating solids may be accomplished by repeatedly, or continuously, adding a layer of the solids to one side of a filter bed supported by a retaining wall and passing a fluid therethrough from the opposite side, and a concurrent movement of the fluid and solids accomplished by passing the fluid therethrough from the same side; that the insertion of a fresh layer, or the removal of a utilized layer, between the filter bed and retaining wall may be accomplished by movement of the bed upon the wall in a fixed position, or by movement of the wall upon the bed in a fixed position, or by movement of both wall and bed together as shown in Fig. 9. If the movement of the layers is towards an exterior cylindrical retaining wall or away from an interior cylindrical retaining wall, the solids will progressively open up with each such movement of the layers; if the movement of the layers is away from an exterior cylindrical retaining wall, or towards an interior cylindrical retaining wall, the solids will progressively consolidate with each such movement of the layers.

It will also be obvious: if the filter bed is moved in a direction counter to the flow of the liquid, the most contaminated of the filter aid solids that make up the bed will come in contact with the first of the liquid to be treated and only fresh solids will be used for the final treatment of the liquid; consequently all of the filter aid solids will be utilized to a much greater extent, and a correspondingly smaller amount required, than if they were used through a mixing operation to form a filter wall precoat for a liquid to be filtered. Therefore, the distribution of the filtered solids throughout the depth of a bed of filter aid solids renewed continuously, or intermittently, will result in a greater flow rate and amount of filtrate for any given clarity than can be obtained by mixing the same amount of filter aid solids in a liquid to form a precoat on a filter wall to aid the subsequent removal of other solids from the liquid, and without the disadvantages of time and equipment required for mixing and precoating opertions. For example, a dehydrocarbon oil can be dewaxed and decolorized by: diluting the oil with a solvent; mixing the diluted oil with a decolorizing carbon; chilling the mixture to precipitate waxy constituents of the oil; maintaining a filter bed of treating solids at a low temperature while the wax and carbon are distributed upon the bed and throughout its depth by the oil passing through in a direction opposed to the movement of the bed; subjecting the filtered wax and carbon and filter bed solids to a chilled medium such as air, or hydrocarbon vapor, or other elastic fluid, or a liquid solvent, to remove the oil soakage; compressing the filtered wax and carbon and treating solids to expel an additional amount of oil; exposing the compacted wax and solids to heat, or solvent treatment, to separate one from the other; and separating the elastic fluid filtrate from the liquid fluid filtrate in a filtrate receiver by drawing off one of the filtrates. In other words, a fluid containing various impurities may be treated by primary solids mixed in the fluid in a discrete condition, and separated therefrom by a con-current movement of the fluid and solids in a direction opposed to a counter movement of secondary treating solids in a unitary mass, the fluid passing through the mass and the primary solids being distributed upon and throughout the mass.

It will furthermore be evident that elastic fluids may be treated by liquid fluids and other elastic fluids for many different purposes in much the same way that liquid fluids are treated. For example, fabric for filters in air conditioning plants may be impregnated with a viscous germicidal fluid in vapor or other form during its manufacture or as the fabric is fed into position on the filter bed, and the air then treated counter-currently by its passage through the bed; or a viscous germicidal fluid may be distributed in vapor or other form throughout the air, and the latter then treated con-currently by its passage through the bed; and such treatment may be utilized to remove pollen, mold spores, yeast, bacteria, dirt, and objectionable odors and gases, the fabric layers being renewed sufficiently frequently to prevent the contaminations from penetrating the entire depth of the bed. Moisture may be added either con-currently or counter-currently in similar manner to humidify the air when the atmosphere is dry; and it may be continuously removed from the air through adsorption by hygroscopic solids in the fabric, and without regeneration of the solids, during passage of the air through a constantly renewed filter bed, the moisture being wrung from the fabric as the latter is extruded from the filter. The removal of the utilized fabric may be made responsive to the volume or velocity of the fluid, or to the resistance to the fluid, passing through the filter bed; and the addition of fresh fabric may be synchronized to compensate for the removal of the utilized fabric.

It will be understood throughout the appended claims: that "renewal of the filter bed" means either the addition of a layer of fresh treating solids to the fluid outlet surface of the bed, or the removal of an utilized layer of treating solids from the fluid inlet surface of the bed, or both; that the meaning of "addition of a layer of fresh treating solids" is to be distinguished over "the addition of fresh treating solids to form a layer"; and that "retaining wall" means any wall capable of supporting a filter bed against the pressure of the fluid passing therethrough and at the same time affording drainage for the filtered fluid, and this meaning may be extended to cover any wall upon which the bed is wound that will afford passage therethrough, or therebetween, of the filtered fluid, or the fluid to be filtered.

I claim as my invention:

1. In a filter, the combination of: an annular filter bed wall of the contiguous layers of filter fabric; an exterior concentric foraminous retaining wall for supporting the filter bed wall; means for moving the said walls together and in contact with each other; and means for renewing a portion of the filter bed during the said movement.

2. In a filter, the combination of: an annular filter bed wall of contiguous layers of filter material; and exterior concentric foraminous endless belt for supporting the filter bed wall; means for moving the filter bed and endless belt together and in contact with each other; and means for interposing a fresh layer of filter material between the filter bed and endless belt during the said movement.

3. A filtrate drainage housing comprising: a cylindrical structure having a plurality of circumferential channels therein; a concentric cylinder suitably spaced from the said structure to form with the structure a receiver for the filtrate; and openings from the channels into the receiver.

4. In a filter, the combinaiton of: a casing; a concentric foraminous retaining wall within the said casing; annular end rings separating the said casing and wall to form a filtrate housing; a concentric filter wall of contiguous layers of filter material within the said retaining wall; two rotatable end plates engaged frictionally with the said filter wall to form an enclosure for the unfiltered liquid; an inlet communicating with the said enclosure and an outlet communicating with the said housing whereby a liquid may be passed through the filter wall; means interior of the said enclosure for removing an utilized surface layer of filter material from the liquid inlet side of the filter wall; a reserve supply of fresh filter material exterior of and adjacent the said casing; said casing having a slot in the wall thereof adjacent the reserve supply and said retaining wall having a passage therethrough adjacent said slot, means engaging the walls of the casing and the retaining wall adjacent said slot and passageway permitting the passage of a layer of filter material from the reserve supply to the interior of said retaining wall and the exterior of said filter wall but preventing the passage of liquid through said passageway and slot; and means for rotating the said end plates and filter wall whereby new material is transferred from the said reserve supply and through the said housing to form a fresh layer on the liquid outlet side of the filter wall.

5. In a filter, the combination of: a casing; a concentric foraminous retaining wall within the said casing; annular end rings separating the said casing and wall to form a filtrate housing; a concentric filter wall of contiguous layers of filter material within the said retaining wall; two rotatable end plates engaged frictionally with the said filter wall to form an enclosure for the unfiltered liquid; an inlet communicating with the said enclosure and an outlet communicating with the said housing whereby a liquid may be passed through the filter wall; means interior of the said enclosure for removing an utilized surface layer of filter material from the liquid inlet side of the filter wall and extruding the said layer from the enclosure; a reserve supply of fresh filter material exterior of and adjacent the said casing; said casing having a slot in the wall thereof adjacent the reserve supply and said retaining wall having a passage therethrough adjacent said slot, means engaging the walls of the casing and the retaining wall adjacent said slot and passageway permitting the passage of a layer of filter material from the reserve supply to the interior of said retaining wall and the exterior of said filter wall but preventing the passage of liquid through said passageway and slot; and means for rotating the said end plates and filter wall whereby new material is transferred from the said reserve supply through the said housing to form a fresh layer on the liquid outlet side of the filter wall.

6. In a filter, the combination of: a casing; a concentric foraminous retaining wall within a said casing; annular end rings separating the said casing and wall to form a filtrate housing; a concentric filter wall of contiguous layers of filter material within the said retaining wall; two rotatable end plates to form with the said filter wall an enclosure for the unfiltered liquid; an inlet communicating with the said enclosure and an outlet communicating with the said housing whereby a liquid may be passed through the filter wall; means interior of the said enclosure for removing an utilized surface layer of filter material from the liquid inlet side of the filter wall and extruding the said layer from the said enclosure; a reserve supply of fresh filter material exterior of and adjacent the said casing; said casing having a slot in the wall thereof adjacent the reserve supply and said retaining wall having a passage therethrough adjacent said slot, means engaging the walls of the casing and the retaining wall adjacent said slot and passageway permitting the passage of a layer of filter material from the reserve supply to the interior of said retaining wall and the exterior of said filter wall but preventing the passage of liquid through said passageway and slot; and frictional means between the said end plates and said filter wall for moving the said walls relatively whereby fresh filter material is transferred from the said reserve supply and interposed between the said walls.

7. In a filter, the combination of: a casing; a concentric foraminous retaining wall within the said casing; annular end rings separating the said casing and wall to form a filtrate housing; a concentric filter wall of contiguous layers of filter fabric within the said retaining wall; two rotatable end plates to form with the said filter wall an enclosure for the unfiltered liquid; an inlet communicating with the said enclosure and an outlet communicating with the said housing whereby a liquid may be passed through the filter wall; an extrusion screw connected to one of the said end plates for removing an utilized surface layer of filter fabric from the liquid inlet side of the filter wall and extruding the said fabric from the said enclosure; a reserve supply of fresh filter fabric exterior of and adjacent the said casing; said casing having a slot in the wall thereof adjacent the reserve supply and said retaining wall having a passage therethrough adjacent said slot, means engaging the walls of the casing and the retaining wall adjacent said slot and passageway permitting the passage of a layer of filter material from the reserve supply to the interior of said retaining wall and the exterior of said filter wall but preventing the passage of liquid through said passageway and slot; and frictional means between the said end plates and said filter wall for moving the said walls relatively whereby fresh filter fabric is transferred from the said reserve supply and interposed between the said walls.

8. In a filter, the combination of: an annular filter bed wall of contiguous layers of filter material; a concentric foraminous retaining wall for supporting the filter bed wall; a reserve supply of fresh filter material; means for moving the said walls relatively to each other along their contacting portions; means for interposing a fresh layer of filter material from the reserve supply between the said walls during the said movement; a compacting screw; and means for rotating the screw whereby a contaminated layer is drawn from the filter bed wall into the screw and compacted and extruded.

9. In a filter, the combination of: an annular filter bed wall of contiguous layers of filter material supported by a concentric foraminous retaining wall; a reserve supply of fresh filter material; means for moving the said walls relatively to each other along their contacting portions; means for interposing a fresh layer of filter material from the reserve supply between the said walls during the said movement; and means for extruding a contaminated layer from the filter.

FRED W. MANNING.